United States Patent [19]

Gunnarsson et al.

[11] Patent Number: 6,126,829

[45] Date of Patent: *Oct. 3, 2000

[54] BIOFILM CARRIER FOR WATER AND WASTE WATER PURIFICATION

[75] Inventors: Lars Ake Hans Gunnarsson, Stehag; Asa Elsa Malmqvist, Lomma; Thomas Gunnar Welander, Furulund; Anders Erik Lofquist, Helsingborg, all of Sweden

[73] Assignee: Kaldnes Miljoteknologi AS, Tonsberg, Norway

[ * ] Notice: This patent issued on a continued prosecution application filed under 37 CFR 1.53(d), and is subject to the twenty year patent term provisions of 35 U.S.C. 154(a)(2).

[21] Appl. No.: 08/702,715

[22] PCT Filed: Mar. 15, 1995

[86] PCT No.: PCT/SE95/00260

§ 371 Date: Feb. 25, 1997

§ 102(e) Date: Feb. 25, 1997

[87] PCT Pub. No.: WO95/25072

PCT Pub. Date: Sep. 21, 1995

[30] Foreign Application Priority Data

Mar. 16, 1994 [SE] Sweden .................................. 9400893

[51] Int. Cl.[7] ...................................................... C02F 3/08

[52] U.S. Cl. ............................................. 210/616; 210/150

[58] Field of Search ...................................... 210/616, 615, 210/617, 150, 151; 261/DIG. 72

[56] References Cited

U.S. PATENT DOCUMENTS

| | | | |
|---|---|---|---|
| 578,548 | 3/1897 | Deruelle | 261/DIG. 72 |
| 3,122,594 | 2/1964 | Kielback | 261/DIG. 72 |
| 3,219,324 | 11/1965 | Williams et al. | 261/DIG. 72 |

(List continued on next page.)

FOREIGN PATENT DOCUMENTS

| | | |
|---|---|---|
| 2689494 | 8/1993 | France . |
| 2325349 | 3/1974 | Germany . |
| 3221128 | 6/1993 | Germany . |
| 2-211292 | 8/1990 | Japan . |
| 1498360 | 1/1978 | United Kingdom . |
| 9111396 | 8/1991 | WIPO . |

OTHER PUBLICATIONS

Teknisk Ukeblad, vol. 139, No. 38, Oct. 1992, Stein Bekkevold, "Suksess for norsk renseteknikk" p. 29.

*Primary Examiner*—David A. Simmons
*Assistant Examiner*—Frank M. Lawrence
*Attorney, Agent, or Firm*—Merchant & Gould P.C.

[57] ABSTRACT

The invention refers to a carrier element to be used as a carrier for a microbial film in a biological water or waste water purification process in which the carrier elements are kept moving in the water. The surface of the carrier element is partly protected against collision with the surfaces of the other carrier elements. The carrier element has flow passages therethrough and is moreover designed to allow good flow of water therethrough also after a microbial film having been established on the surfaces. The carrier element has a length, width and/or height which exceeds 1.5 cm, and the protected area is larger than 100 m²/m³ of the volume of the carrier element. The cross-sectional area of the passage opening in the boundary surface towards the surroundings of the element comprises at least 35% of the boundary surface towards the surroundings of a homogenous body having the same dimensions. The invention also relates to the use of such carrier elements for the treatment of waste water from the wood-processing industry, the waste water containing at least 100 mg/l suspended matter as measured on a GF/A-filter, as well as a reactor for biological water or waste water purification, comprising a reactor tank (20) which contains carrier elements (25) according to the invention and wherein a grid (26) covering the bottom of the tank is provided over aerators (21) at said bottom.

16 Claims, 2 Drawing Sheets

U.S. PATENT DOCUMENTS

| | | | |
|---|---|---|---|
| 3,956,128 | 5/1976 | Turner | 210/150 |
| 4,115,269 | 9/1978 | Bennett et al. | 210/150 |
| 4,122,011 | 10/1978 | Strigle, Jr. | 210/150 |
| 4,275,019 | 6/1981 | Bednarski | 261/DIG. 72 |
| 4,385,988 | 5/1983 | Hypponen | 261/DIG. 72 |
| 4,600,544 | 7/1986 | Mix | 261/DIG. 72 |
| 4,731,205 | 3/1988 | McNutty | 261/DIG. 72 |
| 4,749,493 | 6/1988 | Hicks | 210/150 |
| 4,806,288 | 2/1989 | Nowosinski et al. | 261/DIG. 72 |
| 4,810,385 | 3/1989 | Hater et al. | 210/150 |
| 5,458,779 | 10/1995 | Odegaard | 210/616 |

BIOFILM CARRIER FOR WATER AND WASTE WATER PURIFICATION

The invention relates to a biofilm carrier for water or waste water purification.

BACKGROUND OF THE INVENTION

In biological purification of water or waste water the water is passed through some type of reactor wherein micro-organisms are utilized to convert impurities existing in the water to harmless end products such as carbon dioxide and water. The purification i.a. can be performed under supply of air (aerobically) or without supply of air (anaerobically). In order to increase the efficiency of the purification a high content of active micro-organisms in the process commonly is aimed at so that said organisms are not allowed to escape with the purified water, either by the micro-organisms being allowed to grow in suspension in the reactor and being separated from the water in a separation step after the reactor and being returned to the reactor (e.g. the activated sludge process), or by some type of carrier material being introduced into the process, on the surfaces of which the micro-organisms can grow as a biofilm and thus can be maintained in the process (the biofilm process).

The biofilm process has a number of advantages as compared with the activated sludge process and other processes with suspended biomass. Among other things higher loads can be used and the processes are substantially less sensitive to variations and disturbances. Most conventional biofilm processes are based on the purification reactor being packed with carrier material in the shape of filler bodies or blocks which are fixed to be stationary in the process. These process embodiments have the drawback that there is a risk of the carrier material being stopped by biomass or other particulate material and that dead zones may be established in the process where the contact between the water and the active micro-organisms is very bad.

In another type of biofilm process a carrier material is utilized which is held in suspension and movement in the process. The carrier material with micro-organisms growing thereon is maintained in the process by outgoing water being allowed to pass through a strainer or grid having an opening diameter or slot width which is so small that the carrier material cannot pass therethrough. The advantage of this type of process is i.a. that the risk for stopping of the carrier material and the establishment of dead zones is substantially reduced. Different types of carrier material are available for this type of process: foamed rubber pieces (EP-A-0 142 123), rings of non-woven plastic material (Haikangijutu Vol.29(4): pp 64–69, 1987), and pieces of extruded plastic hoses the surface of which is enlarged by mechanical processing (Haikangijutu vol. 29(4): pp 64–69, 1987), intermixing of material which provides a rough surface (Water Environment Research vol. 64(7): pp 884–889), or introduction of inside partitions and outside fins (WO-A-91/11396). These materials have in common that they have a density which is close to the density of water so as to be easily held in suspension. Although processes with carrier elements of these types often can be operated at high loads all prior art embodiments of carrier elements have, however, drawbacks which substantially limit the capacity of the process, particularly in aerobic processes wherein the supply of oxygen to the working micro-organisms is of decisive importance for the purification efficiency. In foamed rubber pieces and rings of non-woven material the pores often are blocked by growing biomass so that the active surface in contact with waste water and air will be reduced. The carrier elements which have been produced by extruding a plastic hose are small, <1 cm, in order that the surface per volume will be large. Also in these elements the passages often are blocked, and also in case this does not happen it has been found that the supply of oxygen to the biofilm which in most cases is located on the inside surfaces of the carriers is heavily limiting for the process. Also, it has been found that the small size of these carrier elements causes difficult practical problems due to the fact that they will be caught by foam which is produced in the processes, and thus can be carried away from the process by the foam or the wind. Furthermore, there will often arise problems in treating waste water containing suspended particles, e.g. fibers, by the small openings in the strainers or grids holding back the carrier elements being blocked. For e.g. waste water carrying fibers in the forest industry these small carrier elements have been found to be directly unsuitable for this reason.

So far it has not been possible to overcome these problems by making larger carrier elements because it has not been possible as far as prior art embodiments are concerned to provide a large carrier with a large surface for the biofilm, protected against wear, without the efficiency of the process being heavily reduced by a still greater oxygen limitation of the biofilm than in available small carriers.

SUMMARY OF THE INVENTION

The purpose of the present invention is to overcome the said problems, and the invention relates to a carrier element for use as a carrier for microbial film in a biological water or waste water purification process wherein the carrier elements are kept moving in the water, the surface of the carrier element being partly protected against collision with the surfaces of other carrier elements and the carrier element having flow passages and moreover being designed to allow good flow of water therethrough also after a microbial film having been established on the surfaces.

For said purpose the carrier element has characterizing features so as to combine a large size with a large surface protected against wear and with a very good flow of both water and air therethrough. The carrier element according to the invention therefore provides great advantages as compared with prior art carrier materials i.a. by a considerably greater supply of oxygen and by largely reduced risks for stopping of strainers or grids for retaining the carrier material.

The invention also relates to the use of such carrier elements for the treatment of waste water from the wood-processing industry, the waste water containing at least 100 mg/l suspended matter as measured on a GF/A-filter.

Furthermore, the invention relates to a reactor for biological water and waste water purification using the carrier elements according to the invention.

DESCRIPTION OF THE DRAWINGS

In order to explain the invention in more detail illustrative embodiments thereof will be described below reference being made to the accompanying drawings in which.

DESCRIPTION OF THE PREFERRED EMBODIMENT

Figure 1:
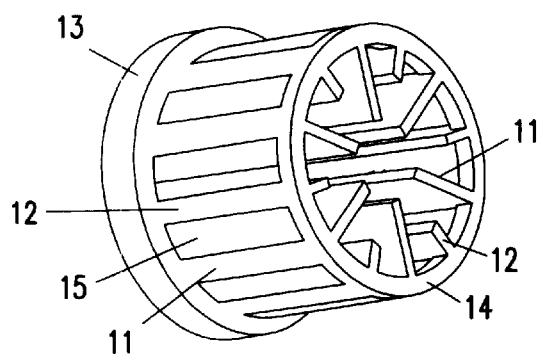
FIGS. 1 and 2 are perspective views of a first embodiment of the carrier element according to the invention as seen from one and the other end, respectively.
Figure 2:
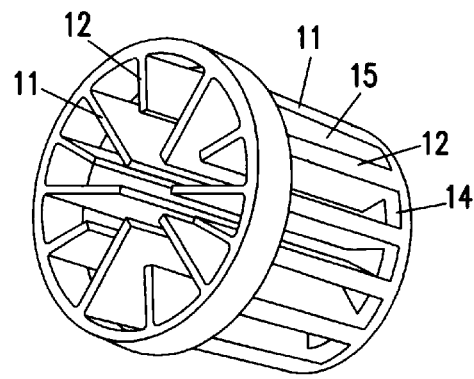
Figure 3:
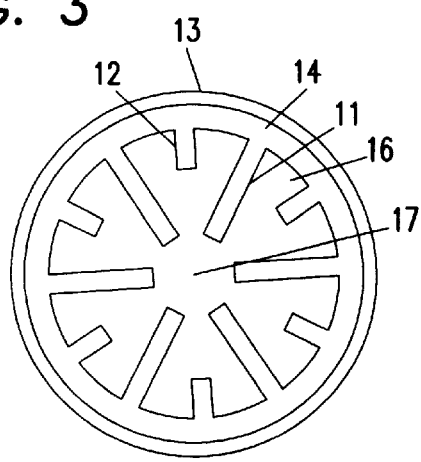
FIG. 3 is an end view of the carrier element in FIGS. 1 and 2 as seen from the same end as in FIG. 1.
Figure 4:
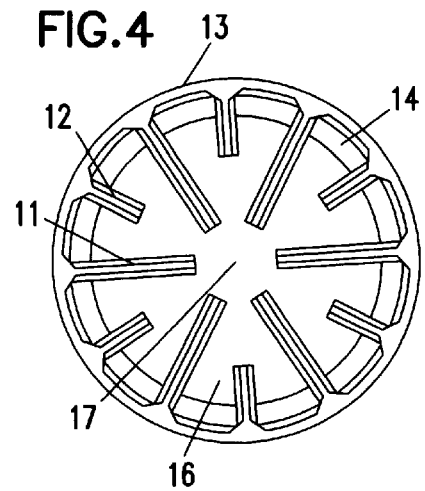
FIG. 4 is an end view of the carrier element in FIGS. 1 and 2 as seen from the same end as in FIG. 2, FIGS. 5 and 6 are corresponding perspective views as FIGS. 1 and 2 of a second embodiment.

The carrier element in all embodiments shown can be described generally as a number of walls arranged and interconnected in such a manner that a large portion of the total surface of the walls is protected against wear against the surfaces of other bodies, that there are free passages for the flow through the carrier element, and that the total cross-sectional area of the passages in the boundary surface towards the surroundings of the carrier element is large. The carrier element in FIGS. 1 to 4 thus comprises twelve equally distributed radial inside walls 11 and 12 which extend axially from one end of the carrier element to the other end thereof. The walls comprise alternating radially longer walls 11 and radially shorter walls 12. The walls are interconnected by means of an outside ring 13 at one end of the carrier element and an inside ring 14 at the other end of the carrier element radial windows 15 being bounded by the walls. The carrier element thus has a structure similar to a turbine wheel. Suitably the carrier element consists of plastics or composite and then can be manufactured by injection moulding. In order that necessary draught shall be provided the envelope surface tapers slightly conically and the walls has a thickness which diminishes from one end of the carrier element to the other end thereof as shown in the drawings. It is possible, however, to make the carrier element of another material than plastics or composite. The carrier element forms several axial passages 16 between the walls and moreover is completely open at the center at 17 to allow an unobstructed flow axially straightly through the element from one end thereof to the other end thereof. The linear length of the element and the diameter thereof are both preferably about 3.2 cm. Generally the length and diameter of the carrier element (width and/or height) should be more than 1.5 cm and preferably ranges from 2.5 to 10 cm, particulary within the interval from 3 to 5 cm. Walls 11 and 12 form protected surfaces i.e. surfaces which are protected against wear by collision with other carrier elements, and on these surfaces a microbial film can grow in the biological water purification process. The totally protected surface should be larger than 100 $m^2/m^3$ volume of the carrier element, preferably larger than 200 $m^2/m^3$, particulary larger than 275 $m^2/m^3$. If the carrier elements are designed so as to have a very large surface, >500 $m^2/m^3$, it can, however, be difficult to avoid that the passages through the carrier element will be so narrow that they are stopped by the growth.

In aerobic processes it is customary to use carrier elements having a density close to the density of water, but according to the invention it has been found that it is advantageous to use carrier elements having a higher density due to the fact that carrier elements having a density close to the density of water without resistance will be carried along by the flowing water and rapidly will escape from raising air bubbles; it follows that water easily will be stationary inside the elements and that air seldom will pass through the inner passages of the carrier element. Carrier elements having a higher density on the contrary tend to move down into the water and resist water and air flow upwards in the process so that water and air will be forced through the inner passages of the carrier element the biofilm being supplied with oxygen. At the same time the air bubbles will be broken down into smaller bubbles, which also increases the transfer of oxygen from air to water. The flow through the carrier elements will be increased at increased density of the carrier element but at densities which are too high, >1.40 $kg/dm^3$, the agitation of the material in the process will be made difficult so that the total efficiency of the process will be reduced. Very good efficiency has been obtained at a density of the carrier elements ranging from 1.20 to 1.30 $kg/dm^3$ where the flow through the carrier elements is high and the mixing is still good. The high density combined with the size eliminates also the risk of the carrier elements being removed from the process by the foaming easily arising at strong aeration.

The combination of size, surface, open structure and density as described above provides a carrier element having considerably improved properties in an aerobic purification process than carrier elements available so far.

The carrier element according to the invention has also been found to have good properties in anaerobic or anoxic purification steps wherein the carrier elements can be kept moving for example by mechanical stirring. In these systems it is also an advantage to choose a density near the density of water in order to avoid high energy supply in order to keep the carriers moving.

These carrier elements have been found to provide very good results in purification of different types of waste water. Particularly the carrier element has been found to provide great advantages in treating waste waters from the wood-processing industry, containing fibers and other particles. By the relatively large size of the carrier element grids having a large slot width can be used for retaining the carrier elements and it has been possible to avoid all problems relating to stopping by fibers etc. Many wood-processing industries which intend to introduce biological purification have already only mechanical purification provided by sedimentation basins for separating fibers etc. A biological process with suspended carrier elements according to the invention can be performed prior to the existing sedimentation because fibers unobstructedly pass through the process. Both fibers and the surplus of biomass produced in the process then can be separated in the existing sedimentation so that no further separation step need to be installed. In some cases a coarse separation of large particles such as chips or bark pieces may be necessary prior to the biological process but in that case it is the question of a substantially simpler and cheaper separation than a sedimentation.

A very important feature of the invention is that a large part of the bounding surface towards the surroundings of the carrier element is open for passage of water and air in and out. The cross-sectional area of the passage openings in the bounding surface towards the surroundings of the carrier element then could comprise at least 35%, preferably at least 40%, particularly at least 50% of the boundary surface towards the surroundings of a homogenous body having the same dimensions.

Particularly advantageous embodiments of the invention in order to satisfy the requirement of a large cross-sectional area of the openings of the passages are such embodiments wherein the carrier element is open for flow therethrough in all three dimensions. The embodiment of FIGS. 1 to 4 is such a preferred embodiment wherein the water can flow freely through the carrier element.

Figure 5:
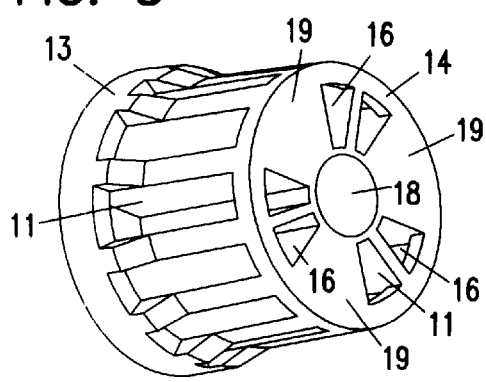
Figure 6:
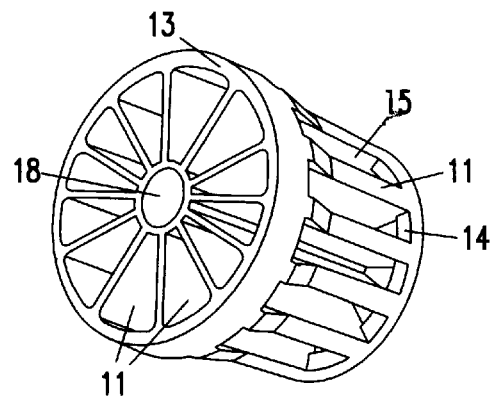

The embodiment in FIGS. 5 and 6 differs from the embodiment disclosed in FIGS. 1 to 4 by an axial tube 18 which is provided in the center of the carrier element and the outside surface of which is connected with walls 11 all having the same radial length. At one end of the carrier element there are alternatingly walls 19 and openings for the axial passages 16, the other end being completely open.

Figure 7:
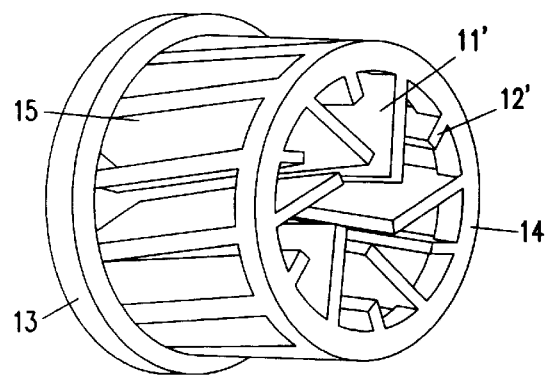
FIGS. 7 and 8 are corresponding perspective views as FIGS. 1 and 2 of a third embodiment.
Figure 8:
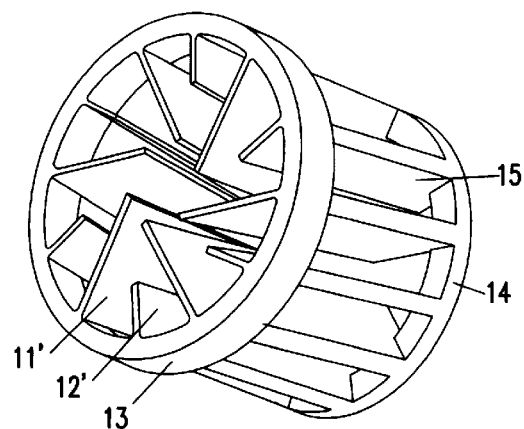

In the embodiment of the invention shown in FIGS. 7 and 8 helical walls 11' and 12' are provided producing a rotational movement of the carrier element at the flow of water therethrough so that the supply of oxygen to the biofilm will be further intensified.

Figure 9:
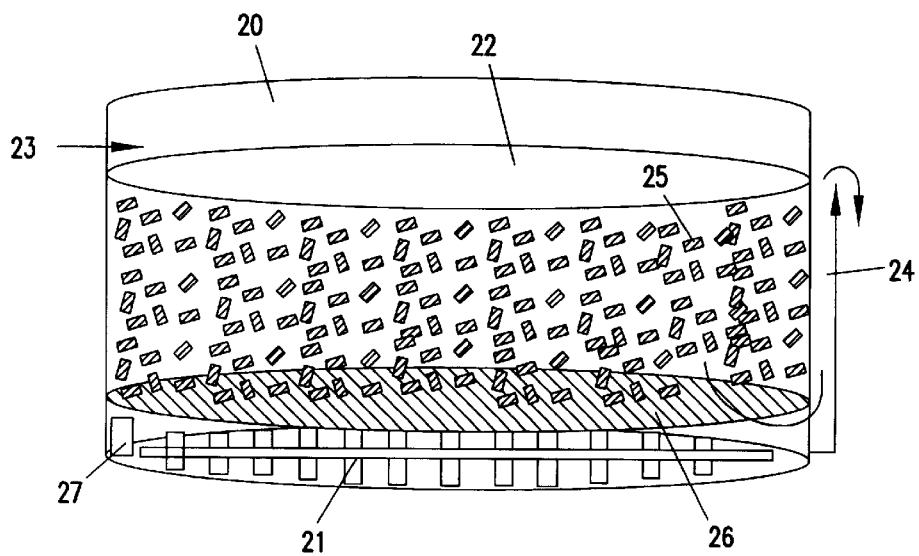
FIG. 9 is a diagrammatic perspective view of a reactor wherein the carrier elements can be used.

The carrier elements are held suspended in the water or waste water to be purified biologically in a reactor wherein air is supplied by means of aerators at the bottom of the reactor as shown in FIG. 9 wherein the reactor tank is designated 20 and aerators at the bottom thereof are designated 21. The water surface in the tank is designated 22. The water is supplied to the tank at the top thereof at 23 and is drained at the bottom via an outlet 24. The carrier elements suspended in the water are designated 25.

A problem which may arise in processes with suspended carrier elements is that aerators must be changed or repaired. The aerators in conventional tanks are difficult to reach because the tank is filled with large amounts of carrier material which sediments on the bottom of the tank when the water is drained. When carrier elements according to the present invention are used this problem can be avoided by the tank being provided with a grid 26 covering the bottom above the aerators 21 at such level that access is provided below the grid to reach the aerators. The grid should have such a slot width that the carrier elements 25 cannot pass therethrough. When the water is being emptied from the tank the carrier elements will settle on the grid and it is then possible to enter into the space below the grid, e.g. through a man-hole 27. This solution of the problem is possible because the carrier elements according to the invention are made so large that a grid can be used which has a sufficient large slot width in order that the air can unobstructedly pass therethrough.

Grid 26 is also used as an outlet grid in order to retain the carrier elements in the process by outgoing water being passed through the grid and then through outlet 24 arranged as a riser. Due to the bottom grid 26 being used as an outlet grid there is no need for a further grid in order to prevent the carrier elements from being carried along by the outgoing water out of the tank. Moreover the risk of stopping of grid 26 is very small because the grid will be continuously rinsed by the air flowing from below through the grid upwards into the tank.

What is claimed is:

1. Method for treating water, the method comprising:

placing a plurality of carrier elements in a body of water, wherein protected surfaces of the carrier elements are protected against collision with surfaces of other carrier elements, wherein the carrier elements have flow passages and allow good flow of water therethrough also after a microbial film has been established, wherein each of the carrier elements has a length, width and/or height exceeding 1.5 cm, each protected surface being larger than 100 $m^2/m^3$ carrier element volume, and wherein a cross-sectional area of passage openings in a boundary surface towards surroundings of each carrier element is at least 35% of a boundary surface of a homogeneous body having the same dimensions; and maintaining the plurality of carrier elements moving in the water, whereby a microbial film establishes on surfaces of the plurality of carrier elements, and the water is treated.

2. The method according to claim 1, further comprising supplying air to the water while maintaining the plurality of carrier elements moving in the water.

3. The method according to claim 1, wherein the air is supplied by an aerator beneath the water.

4. The method according to claim 1, wherein the water is located in a reactor tank, the method comprising maintaining the plurality of carrier elements moving in the water inside the reactor tank.

5. The method according to claim 4, further comprising providing a grid adjacent a bottom of the reactor tank.

6. The method according to claim 1, wherein the water contains at least 100 mg/l suspended matter as measured on a GF/A filter.

7. The method according to claim 1, further comprising providing the passage openings such that water and air can flow into the carrier elements from all directions.

8. The method according to claim 1, further comprising providing the carrier elements with a density in the interval ranging from 0.92 to 1.40 $kg/dm^3$.

9. The method according to claim 8, further comprising providing the carrier elements with the density in the interval ranging from 0.94 to 1.35 $kg/dm^3$.

10. The method according to claim 9, further comprising providing the carrier elements with the density in the interval ranging from 1.10 to 1.30 $kg/dm^3$.

11. The method according to claim 1, further comprising providing the carrier elements with a length, width and/or height in the interval ranging from 2.5 to 10 cm.

12. The method according to claim 11, further comprising providing the carrier elements with the length, width and/or height in the interval ranging from 3 to 6 cm.

13. The method according to claim 1, further comprising providing the protected surfaces to be larger than 200 $m^2/m^3$ carrier element volume.

14. The method according to claim 13, further comprising providing the protected surfaces to be larger than 275 $m^2/m^3$ carrier element volume.

15. The method according to claim 1, further comprising providing the cross-sectional area to be at least 40% of the boundary surface of the homogeneous body having the same dimensions.

16. The method according to claim 15, further comprising providing the cross-sectional area to be at least 50% of the boundary surface of the homogeneous body having the same dimensions.

* * * * *